United States Patent
Donham et al.

(10) Patent No.: US 12,078,738 B2
(45) Date of Patent: Sep. 3, 2024

(54) METHOD, APPARATUS, AND COMPUTER READABLE MEDIUM FOR A MULTI-SOURCE RECKONING SYSTEM

(71) Applicant: MSRS LLC, Granby, CT (US)

(72) Inventors: Nathan Donham, Southern Pines, NC (US); Joshua Burton, Asheville, NC (US)

(73) Assignee: MSRS LLC, Granby, CT (US)

( * ) Notice: Subject to any disclaimer, the term of this patent is extended or adjusted under 35 U.S.C. 154(b) by 135 days.

(21) Appl. No.: 17/579,251

(22) Filed: Jan. 19, 2022

(65) Prior Publication Data

US 2023/0143872 A1    May 11, 2023

Related U.S. Application Data

(60) Provisional application No. 63/277,556, filed on Nov. 9, 2021.

(51) Int. Cl.
| | | |
|---|---|---|
| G01S 19/47 | (2010.01) | |
| G01S 19/25 | (2010.01) | |
| G01S 19/26 | (2010.01) | |

(52) U.S. Cl.
CPC ............ *G01S 19/47* (2013.01); *G01S 19/254* (2013.01); *G01S 19/26* (2013.01)

(58) Field of Classification Search
CPC ........ G01S 19/47; G01S 19/254; G01S 19/26; G01S 19/49; G01S 19/21; G01S 19/215; G01S 19/485; G01S 19/396
See application file for complete search history.

(56) References Cited

U.S. PATENT DOCUMENTS

| | | |
|---|---|---|
| 6,792,353 B2 | 9/2004 | Lin |
| 7,095,336 B2 | 8/2006 | Rodgers et al. |
| 7,302,340 B2 | 11/2007 | Preston |
| 7,425,902 B2 | 9/2008 | Fedora et al. |

(Continued)

OTHER PUBLICATIONS

International Search Report and Written Opinion in PCT/US2022/048529, dated Jan. 13, 2023, 7 pages.

(Continued)

*Primary Examiner* — Abdalla A Khaled
(74) *Attorney, Agent, or Firm* — Gerard M. Donovan; Sidharth Kapoor; Reed Smith LLP

(57) ABSTRACT

Method, systems, and computer-readable media containing instructions which, when executed by a computing device, cause it to receive data from an inertial measurement unit, including GPS data, velocity data, and bearing data, receive data from a digital magnetic compass, including bearing data, receive data from a Doppler sensor, including velocity data and distance data, determining whether GPS location data is in consensus with a previous derived multi-source reckoning system location, determining a consensus distance value from a weighted average of data from the inertial measurement unit and the Doppler sensor, determine a consensus heading value from a weighted average of data from the inertial measurement unit and the digital magnetic compass, determine a consensus geolocation value from a weighted average of data from the inertial measurement unit and the previous derived multi-source reckoning system location, and determine a derived multi-source reckoning system location.

21 Claims, 13 Drawing Sheets

(56) References Cited

U.S. PATENT DOCUMENTS

| | | | |
|---|---|---|---|
| 7,437,062 B2 | 10/2008 | Holcomb | |
| 7,490,008 B2 | 2/2009 | Draganov | |
| 7,505,364 B2 | 3/2009 | Polvani | |
| 7,584,048 B2 | 9/2009 | Pham et al. | |
| 7,756,639 B2 | 7/2010 | Colley et al. | |
| 7,835,863 B2 | 11/2010 | Lokshin et al. | |
| 7,839,329 B2 | 11/2010 | Mao | |
| 7,852,462 B2 | 12/2010 | Breed et al. | |
| 7,856,336 B2 | 12/2010 | Van Wyck Loomis | |
| 7,868,821 B2 | 1/2011 | Hoshizaki | |
| 7,962,285 B2 | 6/2011 | Breed | |
| 8,041,503 B2 | 10/2011 | Choi et al. | |
| 8,159,393 B2 | 4/2012 | Xie et al. | |
| 8,200,423 B2 | 6/2012 | Dietsch et al. | |
| 8,275,544 B1 | 9/2012 | Wells et al. | |
| 8,296,056 B2 | 10/2012 | Becker et al. | |
| 8,386,171 B2 | 2/2013 | Park | |
| 8,560,218 B1 | 10/2013 | Kahn et al. | |
| 8,633,853 B2 | 1/2014 | Amidi | |
| 8,644,843 B2 | 2/2014 | Canon et al. | |
| 8,688,375 B2 | 4/2014 | Funk et al. | |
| 8,725,404 B2 | 5/2014 | Kmiecik et al. | |
| 8,825,397 B2 | 9/2014 | Kasargod et al. | |
| 8,942,725 B2 | 1/2015 | Marti et al. | |
| 8,949,020 B2 | 2/2015 | Lee | |
| 9,026,263 B2 | 5/2015 | Hoshizaki | |
| 9,047,668 B2 | 6/2015 | Haas et al. | |
| 9,064,352 B2 | 6/2015 | Halder et al. | |
| 9,140,567 B2 | 9/2015 | Fryer et al. | |
| 9,234,760 B2 | 1/2016 | DeLuca | |
| 9,297,882 B1* | 3/2016 | Bhatia | H04W 4/029 |
| 9,497,443 B1 | 11/2016 | Sundheimer et al. | |
| 9,568,611 B2 | 2/2017 | Cosatto et al. | |
| 9,727,793 B2 | 8/2017 | Heisele et al. | |
| 9,749,780 B2 | 8/2017 | Huang et al. | |
| 9,778,061 B2 | 10/2017 | Averbuch | |
| 9,835,460 B2 | 12/2017 | Dong et al. | |
| 9,897,454 B2 | 2/2018 | Shikimachi | |
| 9,932,111 B2 | 4/2018 | Spinelli | |
| 9,933,523 B2 | 4/2018 | Fitzgerald et al. | |
| 9,975,632 B2 | 5/2018 | Alegria | |
| 10,031,526 B1 | 7/2018 | Li et al. | |
| 10,036,636 B2 | 7/2018 | Haglund et al. | |
| 10,151,839 B2 | 12/2018 | McPeek | |
| 10,204,459 B2 | 2/2019 | Martin et al. | |
| 10,317,897 B1 | 6/2019 | Kentley-Klay et al. | |
| 10,325,411 B1 | 6/2019 | Laney et al. | |
| 10,373,003 B2 | 8/2019 | Liu et al. | |
| 10,386,202 B2 | 8/2019 | Aucoin et al. | |
| 10,415,984 B2 | 9/2019 | Cai et al. | |
| 10,436,589 B2 | 10/2019 | Dong et al. | |
| 10,533,862 B1 | 1/2020 | Paranjpe et al. | |
| 10,571,270 B2 | 2/2020 | Hakim et al. | |
| 10,584,971 B1 | 3/2020 | Askeland | |
| 10,649,469 B2 | 5/2020 | Salas-Moreno et al. | |
| 10,655,973 B2 | 5/2020 | Khasis | |
| 10,739,152 B2 | 8/2020 | Fryer | |
| 10,816,654 B2 | 10/2020 | Rohani et al. | |
| 10,832,502 B2 | 11/2020 | Levinson et al. | |
| 10,863,166 B2 | 12/2020 | Jung et al. | |
| 10,869,432 B2 | 12/2020 | Wykman et al. | |
| 10,873,832 B2 | 12/2020 | Li et al. | |
| 10,878,282 B2 | 12/2020 | Mei et al. | |
| 10,891,497 B2 | 1/2021 | Cox et al. | |
| 10,907,976 B2 | 2/2021 | Jiao et al. | |
| 10,962,371 B2 | 3/2021 | Bush et al. | |
| 10,983,530 B2 | 4/2021 | Sarkar et al. | |
| 11,002,669 B2 | 5/2021 | Wetzel et al. | |
| 11,009,356 B2 | 5/2021 | Wang et al. | |
| 11,019,280 B2 | 5/2021 | Zhao et al. | |
| 11,034,349 B2 | 6/2021 | Hyun | |
| 11,046,308 B2 | 6/2021 | Hehn et al. | |
| 11,079,235 B2 | 8/2021 | Choudhury et al. | |
| 11,118,914 B2 | 9/2021 | Koponen et al. | |
| 11,168,988 B2 | 11/2021 | Lingard et al. | |
| 11,168,989 B2 | 11/2021 | Fowe | |
| 11,221,220 B2 | 1/2022 | Keene | |
| 11,313,684 B2 | 4/2022 | Chiu et al. | |
| 11,340,632 B2 | 5/2022 | Zlot et al. | |
| 11,415,706 B2 | 8/2022 | Regikumar et al. | |
| 11,513,526 B2 | 11/2022 | Appelman et al. | |
| 11,543,832 B2 | 1/2023 | Baldwin | |
| 11,573,095 B2 | 2/2023 | Liu et al. | |
| 11,578,982 B2 | 2/2023 | Milici | |
| 11,614,340 B2 | 3/2023 | Kim et al. | |
| 11,689,912 B2 | 6/2023 | Nair et al. | |
| 11,709,262 B2* | 7/2023 | Fischell | G01S 13/505 342/41 |
| 2006/0244830 A1 | 11/2006 | Davenport et al. | |
| 2008/0027639 A1 | 1/2008 | Tryon | |
| 2009/0303120 A1* | 12/2009 | Alizadeh-Shabdiz | G01S 19/46 342/357.48 |
| 2013/0085666 A1 | 4/2013 | Zhang et al. | |
| 2015/0133146 A1 | 5/2015 | Mcclendon | |
| 2015/0346349 A1* | 12/2015 | Taylor, Jr. | G01S 5/0264 342/357.26 |
| 2016/0097861 A1 | 4/2016 | Li et al. | |
| 2016/0146616 A1 | 5/2016 | Ren | |
| 2017/0102467 A1 | 4/2017 | Nielsen et al. | |
| 2017/0151070 A1 | 6/2017 | Sun et al. | |
| 2018/0025412 A1 | 1/2018 | Chaubard et al. | |
| 2018/0043211 A1 | 2/2018 | Mohrman et al. | |
| 2018/0306930 A1* | 10/2018 | Laine | G01C 21/1656 |
| 2019/0080335 A1* | 3/2019 | Degeneffe | G06Q 30/018 |
| 2019/0287307 A1* | 9/2019 | Rogers | G06T 15/08 |
| 2020/0348136 A1* | 11/2020 | Jain | G01C 21/16 |
| 2021/0020073 A1 | 1/2021 | Asmari et al. | |
| 2021/0262800 A1 | 8/2021 | Levine et al. | |
| 2021/0405213 A1 | 12/2021 | Tuck et al. | |
| 2022/0155402 A1 | 5/2022 | Nawaz et al. | |
| 2022/0299341 A1 | 9/2022 | Zhang | |
| 2022/0373339 A1 | 11/2022 | Xu et al. | |
| 2023/0060793 A1* | 3/2023 | Wang | G01S 19/393 |
| 2023/0162111 A1 | 5/2023 | Menipaz et al. | |
| 2023/0177545 A1 | 6/2023 | Tubilla et al. | |
| 2023/0194733 A1 | 6/2023 | Schlenter et al. | |

OTHER PUBLICATIONS

Mok, E., et al., "Investigation of Seamless Indoor and Outdoor Positioning Integrating WiFi and GNSS", Shaping the Change XXIII FIG Congress, Munich, Germany, Oct. 8-13, 2006, 15 pages.

Retscher, G., "Mobile Multi-sensor Systems for Personal Navigation and Location-based Services", Geowissenschaftliche Mitteilungen, 2007, vol. 81, 120 pages.

Mok, E., et al., "Location determination using WiFi fingerprinting versus WiFi trilateration", Journal of Location Based Services, Jun. 2007, 1(2):145-159.

Kjaergaard, M.B, "A Taxonomy for Radio Location Fingerprinting", Conference Paper, Sep. 2007, 19 pages.

Bejuri, W., et al., "Ubiquitous Positioning: A Taxonomy for Location Determination on Mobile Navigation System", Signal & Image Processing : An International Journal(SIPIJ), Mar. 2011, 2(1):24-34.

Oshin, T.O., et al., "A Method to Evaluate the Energy-Efficiency of Wide-Area Location Determination Techniques Used by Smartphones", IEEE/IFIP EUC 2012, Paphos, Cyprus, Dec. 7, 2012, 9 pages.

The Charles Stark Draper Laboratory, Inc., "SAMWISE—How can autonomous vehicles navigate unknown environments without relying on GPS?", 2018, <https://www.draper.com/explore-solutions/samwise>, 2 pages.

Leonardo DRS, Inc., "A-PNT Converged Computer-Embedded and Scalable (AC2ES)" Datasheet, 2019, 3 pages.

Breaking Media, Inc., "Army developing software to let PNT sensors talk to each other", Nov. 8, 2021, <https://breakingdefense.com/2021/11/army-developing-software-to-let-pnt-sensors-talk-to-each-other/>, 2 pages.

(56) References Cited

OTHER PUBLICATIONS

War Blog, "Assured-PNT for all 160,000 tactical vehicles is now a reality", Nov. 18, 2021, <https://warblog.org/military/assured-pnt-for-all-160000-tactical-vehicles-is-now-a-reality/>, 5 pages.

* cited by examiner

METHOD, APPARATUS, AND COMPUTER READABLE MEDIUM FOR A MULTI-SOURCE RECKONING SYSTEM

CROSS-REFERENCE TO RELATED APPLICATION

This application claims benefit of and priority to U.S. Provisional Application No. 63/277,556 filed Nov. 9, 2021, the content of which is hereby incorporated herein by reference in its entirety.

BACKGROUND

GPS systems are ubiquitous. Most people carry GPS receivers everywhere they go in their mobile phones and use their GPS-equipped phones for localization and navigation. Drivers rely on GPS navigation for direction and mapping to their destination. Critical infrastructure, such as commercial trucking and shipping, relies on GPS navigation to keep worldwide supply chains on track. The US government built and operates the GPS system, and military forces rely on having accurate location and navigation data.

GPS has become the foundation of sophisticated systems designed to provide sometimes more accurate, useful, and predictive data. For example, GPS and accelerometers provide information to fitness trackers. Autonomous vehicle systems combine GPS data with data from various sensors, such as cameras, RADAR, LIDAR, and inertial measurement units (IMUs) to know their location, bearing, speed and to respond to the surrounding environment. Extensive resources have been expended over the past decades to build on and improve GPS.

Because of their reliance on GPS, such systems suffer accuracy and reliability degradation when they receive insufficient data from the GPS constellation. Interference devices can block GPS altogether, and even known GPS systems using secondary sensors for reckoning suffer unacceptable amounts of drift without periodic reliable GPS data. Further, sophisticated spoofing systems are capable of luring ships off course into dangerous waters or providing false information on battlefields.

Accordingly, improvements are needed to localization and navigation systems to provide resilience and reliability in environments with unreliable GPS data.

DETAILED DESCRIPTION

The present invention relates to a multi-source reckoning system that provides improved localization and navigation in environments where GPS systems may be compromised, unreliable, or unavailable. Embodiments may implement improved methods of receiving and containerizing data from an extensible set of sensors. Embodiments may use sensor data from multiple distinct types of sensors to generate consensus heading and distance data, and may implement artificial intelligence to identify patterns of errors in the data from each sensor type and to cancel those errors, resulting in reduced error or drift from a known good location.

Figure 1:
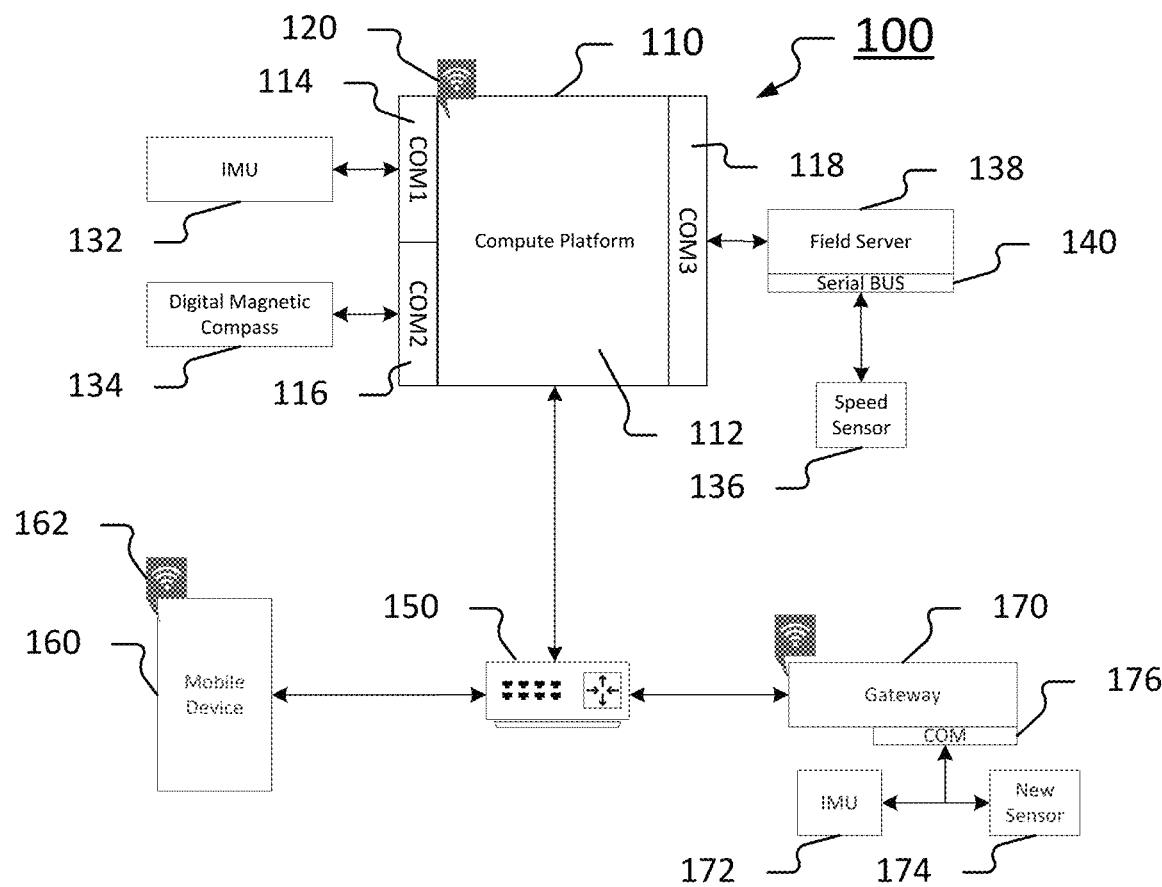
FIG. 1 illustrates a multi-source reckoning hardware system 100 implementing an exemplary embodiment.

FIG. 1 illustrates a multi-source reckoning hardware system 100 implementing an exemplary embodiment. For example, system 100 may be a communication system implemented within a vehicle. Hardware system 100 may include a multi-source reckoning server 110 configured to receive data from multiple sensors and process the data as disclosed herein. Multi-source reckoning server 110 includes a compute platform 112. The compute platform 112 may, for example, be an off the shelf tactical computing system including a processor, memory, a communication bus, interfaces, and an operating system. For example, the processing component may include an x64 central processing unit and run a Microsoft Windows operating system, such as Windows 10. Multi-source reckoning server 110 also includes multiple communication interfaces 114, 116, 118, and 120 configured to communicate with plurality of sensors. The communication interfaces may be a combination of wired and wireless communication interfaces, such as wired communication interfaces 114, 116, and 118 and wireless communication interface 120. Communication interfaces 114, 116, and 118 may, for example, comprise one or more USB, serial, or Ethernet (e.g., RJ45) ports configured to communicate with sensors. Communication interface 120 may be a wireless interface comprising one or more Wi-Fi (IEEE 802.11), Bluetooth, near-field communication ("NFC") or other wireless communication interface configured to communicate with sensors. Embodiments may also include a wired network interface, for example an RJ45 interface, for wired communication over a network. While the multi-source reckoning server 110 is shown with communication interfaces 114, 116, 118, and 120, alternative embodiments may include more or different communication interfaces. Specifically, exemplary embodiments may include multiple wireless communication interfaces 120 to facilitate communication with sensors and communication with mobile devices for displaying localization and navigation information and providing a user interface to interact with multi-source reckoning server 110.

The sensors attached for processing component may include an IMU 132 communicatively coupled with communication interface 114, a digital magnetic compass ("DMC") 134 communicatively coupled to communication interface 116, and a speed sensor 136, such as the GMH Engineering Delta DRS1000 non-contact Doppler radar speed sensor, communicatively coupled to a field server 138 via a serial bus 140 (e.g., an RS-485 connection). While exemplary hardware system 100 shows IMU 132 and DMC 134 directly connected to communication ports of computing device 110, it is understood that those devices may be connected directly or via one or more intervening device, for example to facilitate protocol translation or interface compatibility. Similarly, while speed sensor 136 is shown coupled to communication interface 118 via field server 138 via a serial bus 140, in alternative embodiments the sensor may interface directly with a communication interface of multi-source reckoning server 110. In alternative embodiments, the multi-source reckoning server 110 may have additional communication interfaces and may communicate with additional or different sensors. Additionally, while the exemplary embodiment depicts the capability of bidirectional communication with sensors, embodiments may include sensors utilizing unidirectional communication, such as Doppler.

Compute platform 112 may communicate with a networking device 150 via communication interface 120, for example via wireless communication. Networking device 150 may provide network switching or routing functions to enable communication between multiple devices. For example, one or more mobile device 160 may communicate via a communication interface 162 with the multi-source reckoning server 110 via networking device 150. The mobile device 160 may be, for example, a mobile phone or tablet using the Android operating system. In alternative embodiments, networking device 150 may provide communication via wired communication interfaces. In other embodiments, communication interface 120 of multi-source reckoning server 110 may be able to directly communicate with communication interface 162 of mobile device 160, for example via a direct wireless communication channel. Mobile device 150 may also provide sensor data to the multi-source reckoning server 110, for example via internal GPS, accelerometer, and digital gyroscope sensors.

One or more network-based gateway 170 may additionally communicate with multi-source reckoning server 110 via networking device 150 (or via a direct network connection). The gateway 170 may comprise, for example, a Raspberry Pi or Arduino microcontroller configured to facilitate networked communication between the multi-source reckoning server 110 and one or more additional sensors, such as an IMU 172 or a new sensor 174 connected through a communication interface 176. New sensor 174 may be any type of sensor having an interface capable of communicating with the network-based gateway 170.

In some embodiments, the multi-source reckoning server 110 and components with wired connections may be housed in a protective case to enable portable deployment, for example in military or commercial vehicles or crafts. Gateway 170 and connected sensors may comprise various vehicle-mounted sensors.

The multi-source reckoning server 110 is designed to be agnostic to both the type of sensor (e.g., compass, speed sensor, accelerometer, etc.) and the technical design of the sensor (e.g., data format, communications protocol, etc.). By allowing for all sensor types and designs, the system can be augmented with new sensors for increasing complexity and accuracy, and to be robust against technical changes over time. To provide this functionality, it includes a purpose-built communications architecture to collect data from each sensor and store the sensor data in a common database. Accordingly, the multi-source reckoning server includes a hybrid virtualization and containerization structure. A virtual machine, such as a 64-bit Windows-based virtual machine, and a variety of Docker containers execute on the compute platform 112 to communicate with, collect data from, and standardize formats for each connected sensor. The containerization of each sensor's micro-service allows for custom, on-demand development, maintenance, and management for each sensor. The compute platform 112 thus can receive and normalize data from each sensor's unique data transmission format. By maintaining each sensor's data in its own container, the multi-source reckoning server is scalable and extensible as sensors are added or changed. Accordingly, while the multi-source reckoning hardware system 100 includes exemplary sensors as shown, alternative or additional sensors may be utilized by the system, such as GPS, digital gyroscopes, fiber optic gyroscopes, barometers, cameras, digital altimeters, pitot tubes, transducers, LIDAR, and wheel encoders.

Multi-source reckoning server 110 may pull the data from each sensor into its respective container in either a batch, micro-batch, or streaming process. The virtual machine coordinates with each container to standardize time and pull data at a requested interval. In alternative embodiments, the virtual machine may control and pull data from the sensors directly, however, in the preferred embodiment, control and management of the sensors is decoupled from the virtual machine, and moved to each sensor's container, to allow for the sensor containers to pull data at an independent rate, such as the maximum rate for each sensor, while the virtual machine dynamically pulls data at rates optimized for its location derivation processing. The containerized structure maximizes efficiency of pulling data from the sensors, while allowing the virtual machine to handle a broader set of tasks agnostic to specific sensor data formats and protocols, including pulling the data, optimizing the process that determines which data to pull, orchestrating time management across the variety of sensor data feeds, and storing those data in a common database to be used by an artificial intelligence engine, discussed below. This architecture reduces complexity and mitigates the performance implications of managing a plurality of sensors directly from the virtual machine. The virtual machine executes codes that dynamically makes decisions about which data to pull from the containers and at which time. The decision is made based on real-time analysis of the sensor data feeds and overall performance of the multi-source reckoning system 100. When the data is collected, it is stored, for example by the virtual machine, in a common database that can be accessed by the location derivation processes discussed below.

Figure 2:
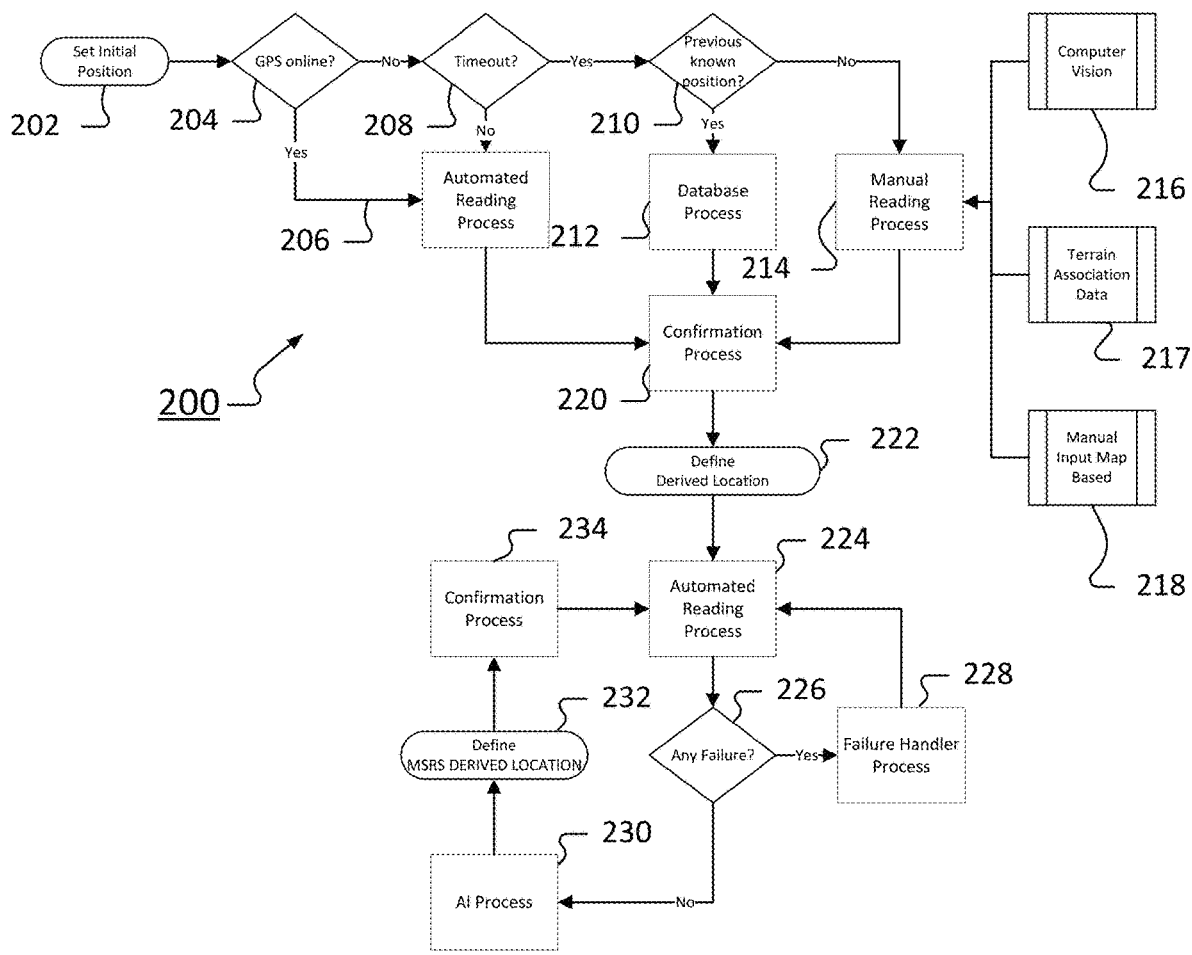
FIG. 2 illustrates a process flow 200 for deriving and updating a multi-source reckoning system location according to exemplary embodiments.

FIG. 2 illustrates a process flow 200 for deriving and updating multi-source reckoning system 100 location information according to exemplary embodiments. The exemplary process flow may rely on a premise that the initial position of the multi-source reckoning system 100 is known and trusted. At 202 at an initial time ($t_0$), the system starts a process for setting an initial position. It may do this first by determining if there is a trusted GPS reading. At 204, the system may check whether it has GPS online, for example checking whether the system is connected to a GPS receiver and that the GPS receiver is receiving signals from the constellation. If not, at 208 the system may attempt to bring a GPS subsystem online to read location information. If the GPS subsystem is already online, or it comes online without timing out, the system may start an automated reading process. As discussed above in the context of FIG. 1, the reading process may be containerized such that a GPS reading process communicates with a GPS subsystem and a multi-source reckoning system virtual machine may obtain GPS location information from the containerized GPS reading process.

If a GPS subsystem is unavailable or times out, at 210 the system may determine if there is a trusted previously-known location in the database. If so, a database process 212 may retrieve the previously known location. If there is not a trusted previously-known location in the database, at 214 the system may perform a manual reading process. At 216, computer vision may be used to provide location data to the manual reading process. Alternatively, at 217 a user may select their location based on the location of other objects or terrain and the manual reading process may determine the user's location based on the user's input data in a database of terrain association date. For example, a user may look at a map showing terrain data and place a pin at their current location in relation to buildings, roads, or other terrain markers. Alternatively, at 218 a user may manually input a location, for example on mobile device 160 by entering their latitude and longitude. A user may confirm the accuracy of a last known position, for example upon application startup.

Process flow 200 illustrates an exemplary prioritization where a multi-source reckoning system may identify an initial location by first attempting to use GPS, then attempting to access a last known location, and then performing a manual reading process. The prioritization, however, may be user customizable, thus enabling a user to manually enter a known location if preferred, for example. Embodiments may also attempt to retrieve GPS location information, last known position, and manually entered position information in parallel.

The location data received from any of GPS, previously-known position in the database, or user-input location may be fed into a confirmation process 220 to determine consensus among them. The confirmation process intelligently averages the latitude and longitude values received from the different inputs based on weights calculated through an artificial intelligence process. As part of the confirmation process, embodiments may allow or require a user to confirm the consensus position on mobile device 160. At 222, the consensus position is defined to be the initial derived multi-source reckoning system location.

At 224, the system may perform an automated reading process to read sensor data from various sensors, for example the sensors in communication with the multi-source reckoning server 110. As discussed above in the context of FIG. 1, containerized processes may read from various sensors, for example at a maximum rate per sensor, independently of a multi-source reckoning system virtual machine. The virtual machine may read location information at some small time increment in the future ($t_e$), such as 1 second or 0.1 seconds from to, before any movement has taken place. The system may evaluate whether the initial position and the GPS remain consistent; if they do, the system considers that GPS is available. This check continues over time to maintain stateful awareness about whether GPS is available. If GPS is available, it will be shown to the user, for example on mobile device 160, along with the derived location.

During the automated reading process, at 226 the system performs statistical analysis to determine if there have been any failures or measurable errors with the various sensor readings. If the system detects errors, at 228 an error handler process is launched. The error handler process 228 will loop through a sensor reset process until the failure no longer exists. The error information may be sent to a front-end application to alert the user of a potential problem, such as a disconnected sensor or a network error. If there are no errors at 226, or if the failure is corrected at the failure handler process, the system initiates the AI process 230 which calculates the derived multi-source reckoning system location ("DML").

Once the System calculates the DML, at 234 the confirmation process may determine consensus among other location readings that exist, whether they be previous records in the database, separate GPS readings, or other corroborating or contradictory information. This DML reading is then read into the system again recursively at the automated reading process 224.

The DML is designed to provide reliable location information even when GPS is denied or degraded. GPS denial is characterized by a receiver's inability to obtain a valid fix. Whatever the reason for GPS denial, it is immaterial to system operation, as the receiver is simply unable to identify enough (or any) satellites to multilaterate. The condition is binary; either one can receive some location information from the GPS receiver or one cannot receive any location information from the GPS receiver. The result in the reading process 224 is an immediate and complete deference to the analysis of combined sensor data.

By contrast, GPS degradation is characterized by an inaccurate fix identified by the receiver. Whether intentional (e.g., spoofing, jamming, etc.) or accidental (e.g., space weather, RF interference), the GPS receiver obtains a fix, but that fix does not represent its true position. The AI process 230 may identify GPS degradation by implementing a rules-based heuristic approach consisting of several tests. For example, consider a hypothetical, one-dimensional change in latitude over time of a moving GPS receiver with an actual movement path along a straight line from latitude 39.1679199° to 39.1679211° north. The following chart illustrates the actual path of movement, as well as a GPS detected Path A and a GPS detected Path B:

| Time (sec) | Actual | Path A | Path B |
|---|---|---|---|
| 0 | 39.1679199 | 39.1679199 | 39.1679199 |
| 5 | 39.1679201 | 39.1679197 | 39.1679206 |
| 10 | 39.1679203 | 39.1679206 | 39.1679208 |
| 15 | 39.1679205 | 39.1679201 | 39.1679209 |
| 20 | 39.1679207 | 39.1679209 | 39.1679211 |
| 25 | 39.1679209 | 39.1679204 | 39.1679212 |
| 30 | 39.1679211 | 39.1679209 | 39.1679216 |

Figure 12:
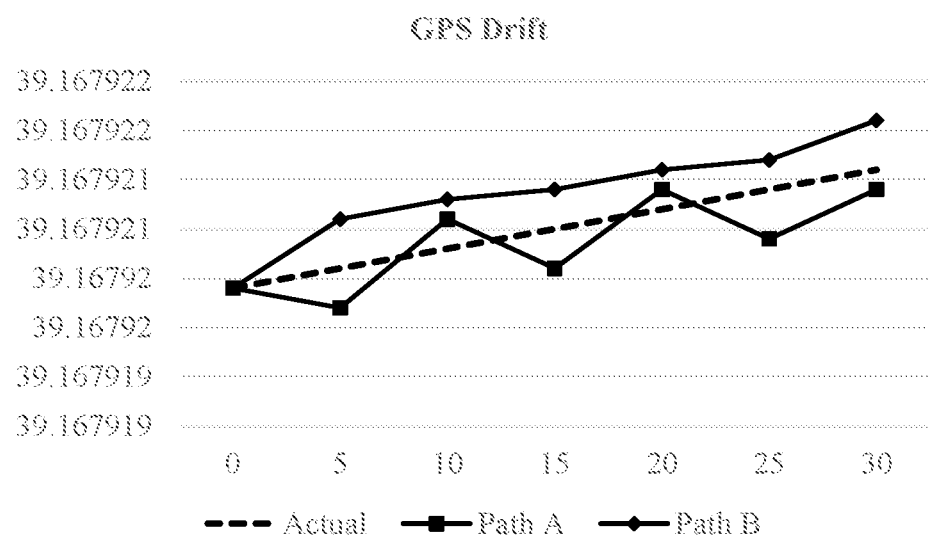
FIG. 12 shows the one-dimensional change in latitude over time of a moving GPS receiver with an actual movement path along a straight line, as well as GPS detected Path A and Path B.

FIG. 12 is a one-dimensional chart which illustrates the Actual path of travel as well as GPS detected Path A and Path B.

The AI Process identifies and corrects for Consistent Directional Deviation (CDD). To identify CDD, the process takes the element-wise difference between the Actual path and Path A and the Actual path and Path B. For example, for Path A the process would compute {diff(39.1679199, 39.1679199), diff(39.1679201, 39.1679197), diff (39.1679201, 39.1679197), . . . diff(39.1679211, 39.1679209)}. The element-wise difference results in two vectors: A'={0.00000000000, 0.00000040000, −0.00000030000, 0.00000040000, −0.00000020000, 0.00000050000, 0.00000020000} and B'={0.00000000000, −0.00000050000, −0.00000050000, −0.00000040000, −0.00000040000, −0.00000030000, −0.00000050000}. By determining the element-wise difference, the process identifies that Path B has a uniform sign, i.e. all element-wise differences are negative. For a large number of elements in B', the probability that all signs are consistently in the same direction (i.e., positive or negative) grows smaller. The system may demonstrate and empirically quantify CDD when data is collected. The low probability of CDD across a large sample indicates a directional bias in the receiver itself, which the system may identify and account for, or of a degradation scenario indicating the system should increasingly rely on data from the combined non-GPS sensors.

CDD represents a special case of GPS drift, whereby the difference vector of B' is consistently one sign. The system can easily identify this scenario because of its stark difference from vector A'. In practice, the signs may not be entirely consistent. For this more general case, embodiments may utilize a rolling average of the difference to gain additional insight into the reliability of GPS data. The process may determine the rolling (moving) average across n number of periods, and record the values in a data structure:

$$\frac{1}{n}\sum_{i=1}^{n}(\text{Actual}_i - \text{Path}_i)$$

Under normal circumstances, the average should remain stable without growing in magnitude, particularly for larger and larger values on n. Instability, whereby the magnitude of the absolute value increases over time, indicates to the process that it should increasingly rely on the analysis of the combined sensor data, either supplementing GPS or relying entirely on combined data of non-GPS sensors to determine travel from a trusted location.

The system may determine an appropriate value for n empirically when data is collected, or it may start from a default number (e.g., ten). The method preferably utilizes the arithmetic mean as a summary statistic to determine stability. Alternative methods could be implemented such as geometric mean, harmonic mean, exponential smoothing, and exponential decay to determine stability. However, those methods, while tunable in the latter two cases, risk an over- or under-sensitivity to the pattern of data streaming in, damping or driving any degradation signal, thus are less desirable than utilizing an arithmetic mean.

The process may also monitor for dropped satellites. While GPS receivers require six satellites to provide a position in three-dimensional space, eight satellites are typically visible for every point on the globe. In open (unobstructed) sky, GPS receivers should easily locate seven or eight satellites. As position accuracy is a function of the number of satellites that are used in multilateration, when fewer satellites are used, signal degradation is a viable possibility. When the multi-source reckoning system receives GPS geolocation data computed from less than six satellites, the process increases its reliance on analysis of combined non-GPS sensors.

The process may also monitor for sequential satellite drops, and increase reliance on combined non-GPS sensors upon detection of sequential satellite drops.

Upon detection that GPS is unavailable or degraded, embodiments may employ one or both of two independent approaches to calculating a derived multi-source reckoning system location. The first approach computes current location in reference to one or more other objects with a known location (i.e., geolocation). Embodiments may utilize artificial intelligence computer vision to identify patterns in the field of view, to map those to a pre-defined almanac of terrain features using artificial intelligence pattern matching, and identify a current location based on triangulation of known terrain features or landmarks (e.g., a mountain ridge, an air traffic control tower, etc.). The second approach computes current location using kinematic equations along with the arc-haversine function to calculate a current location relative to a last known location. Embodiments employing both approaches may compute a consensus location based on the output of each approach.

Figure 3:
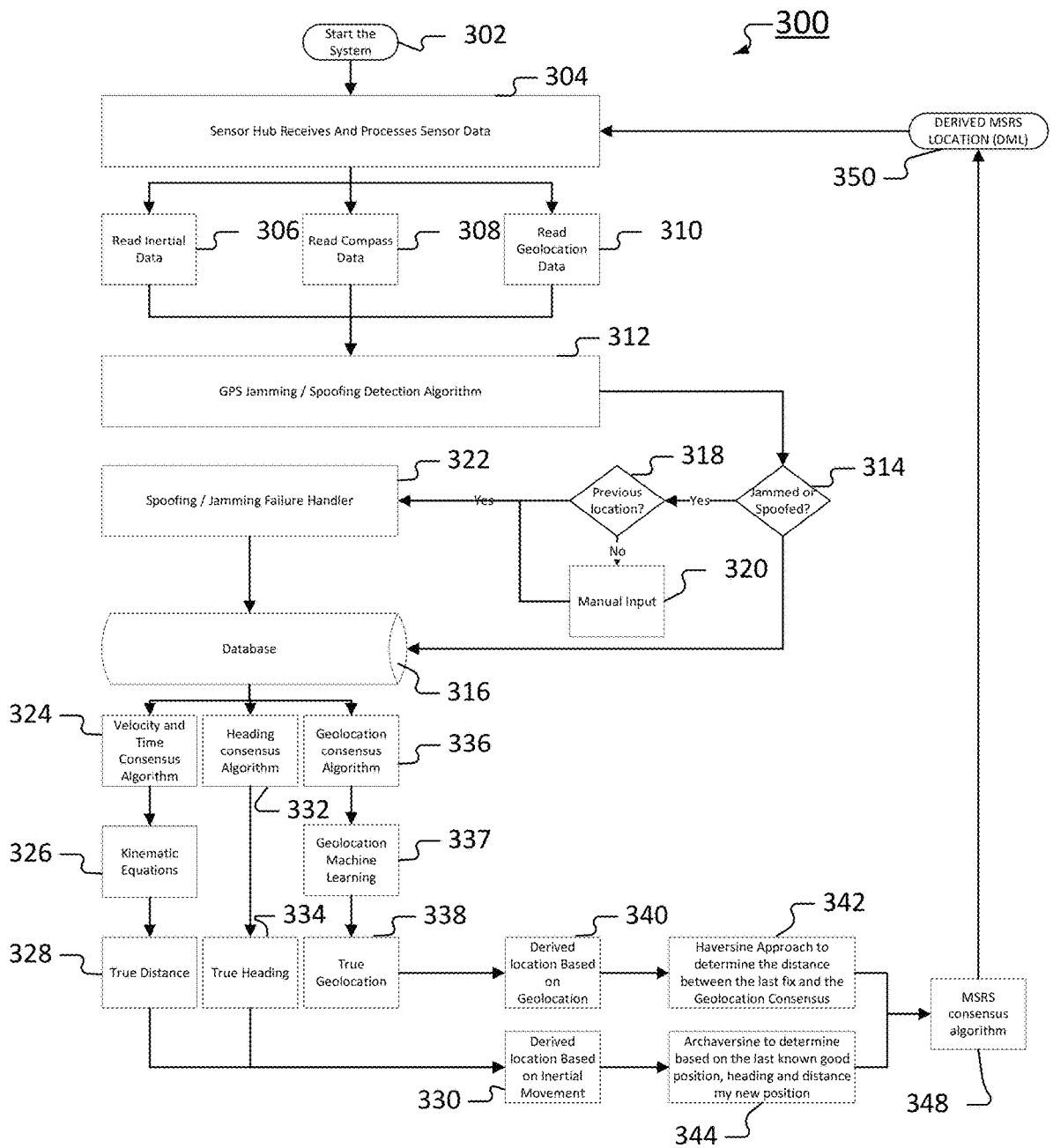
FIG. 3 illustrates a process flow 300 for deriving and updating a multi-source reckoning system location according to an exemplary embodiment by computing a consensus of haversine and archaversine derived locations.

FIG. 3 illustrates a process flow 300 for deriving and updating a multi-source reckoning system location according to an exemplary embodiment by computing a consensus of haversine and archaversine derived locations.

At 302, the system starts and data begins flowing to the sensor containers. At 304, the containers receive and process data from various connected sensors, and stage that data for consumption by a multi-source reckoning system virtual machine. The processing at 304 may include artificial intelligence analysis of GPS geolocation data and data correction to address drift or degradation, as discussed above. It receives a new DML on each iteration and combines the sensor data with the location to produce a new coordinate. This coordinate will then feed into the spoofing detection algorithm. The difference between the new DML and the prior location will be measured and provide feedback on whether or not the new position is realistically achievable using the collected inertial data, the DML, and compass data. For example, if the sensors state that the vehicle travelled 100 meters, but the difference between the two coordinates is 500 meters, then it is evident that the GPS reading is inaccurate. At 306, the virtual machine reads inertial data from a container staging data from an inertial sensor and stores it in a database. At step 308, the virtual machine reads digital magnetic compass data from a container receiving data from a DMC and stores it in the database. At step 310, the virtual machine reads geolocation data from a container receiving data from a GPS and stores it in the database. Those of skill in the art understand that the pre-processing by each respective container may be optimized for the sensor from which each container receives data. The sensors and containers from which data is received in process flow 300 are exemplary, and the system is agnostic as to specific sensors and containers and may receive location, direction of travel, and movement data from alternative sources.

At 312, the system then uses denial and degradation heuristics to analyze GPS location data. At step 314, the system determines whether the GPS location is in consensus with a derived multi-source reckoning system location, or whether instead the GPS signal is being jammed or spoofed. While embodiments are designed to provide a multi-source location system resilient to intentional jamming or GPS spoofing, at 314 the system may determine whether the system should utilize multi-source reckoning data instead of GPS due to signal denial or degradation. If the system determines that the GPS remains reliable, it proceeds to 316 and may store GPS and multi-source location data in the database. If at 314 the system determines that the GPS reading is denied, degraded, or inconsistent with the DML, the system stops displaying the GPS information, and defaults to providing location information based on multisource reckoning system data only. Embodiments may identify on the display of a wireless device that the system is no longer displaying GPS information and instead is displaying DML location information based on multi-sensor reckoning. The system continues to monitor for GPS location information, if available, and will present that information again when it determines at 314 that the GPS is again reliable.

At 318, the system checks whether it has a previous location in the database. If no previous location is detected, at 320 the system prompts a user for manual input. The system may also prompt a user for manual input if a difference vector comparing GPS data to past or expected GPS data exceeds a threshold value. Manual input may be, for example, by a user entering their latitude and longitude or the identification of a known location into a wireless device in communication with the multi-source reckoning system server. Alternatively, a user may utilize a digital sextant communicatively coupled to the multi-source reckoning server to manually enter a location. While manual location input may be performed at 320, embodiments may allow for optional manual input at any time to re-initialize a known accurate location, thus improving quality of the DML. For example, a user interface on a mobile device may include an option to allow a user to manually input a location at any time, for example by entering latitude and longitude or providing digital sextant information, but may prompt a user to provide a manual input at 320 in response to detection of GPS jamming, spoofing, or other degradation or denial if the system does not have a known previous location in the database. The system may also prompt a user to manually input a location if more than a threshold amount of time has passed since a previous location has been entered in the database.

At 322, the system commences the process of calculating a DML to display to a user when GPS is unreliable. At 316, the system pulls the necessary data from the database on the virtual machine for both the haversine and archaversine location derivation processes.

At 324, the system applies a velocity and time consensus algorithm to velocity and time data from the database, along with error correction methods. The velocity and time data may be supplied to the database from containers that received data from one or more IMUs. At 326, the system applies kinematic equations to the consensus velocity, time, and acceleration values. At 328, distance traveled may be derived from the speed over time using a speed sensor, inertial measurement unit, wheel encoder, or similar technique. The system may compute the true distances by intelligently averaging with an artificial intelligence process distance traveled by combining the output of the kinematic equations, the distance derived from one or more distance sensor, and other corrections based on the output of error correction done in the AI process.

At 332, the system applies a heading consensus algorithm to heading data from the database. The heading consensus algorithm may utilize an artificial intelligence process to analyze heading data received from any one or more of a variety of compasses (e.g. rotation vector, magnetometer, digital magnetic compass, etc.). It may also optionally utilize angular velocity or acceleration received from a gyroscope or IMU to intelligently identify changes in direction and whether correction or weighting of sensor data is required. At 334, the system computes a true heading based on the output of the heading consensus algorithm.

At 336, the system applies a geolocation consensus algorithm to intelligently average latitude and longitude values based on weights calculated through an artificial intelligence process. At 337, a geolocation machine learning analyzes data from the geolocation consensus algorithm. At 338, intelligent weighted averaging of estimated locations from multiple sensor inputs cancels out the error associate with each individual approximation, generating a true geolocation with higher confidence in the location approximations. At 340, an artificial intelligence process may apply terrain association, for example using terrain location data as described above, or celestial navigation information to create a set of approximated locations, and apply pattern recognition to identify a true geolocation.

At 342, the system applies a haversine approach to determine the distance between the last fix and the geolocation consensus. In this context, the last fix may be the previous GPS location before spoofing/jamming was detected. Alternatively, the last fix may refer to a manual input of reliable location information. Using the latitude and longitude of the last fix as lat1 and lon1 and the latitude and longitude of the geolocation as lat2 and lon2, the haversine great-circle distance can be computed:

$$\text{distance} = 2 * \text{radius} * \cos^{-1}\left(\sqrt{\sin\left(\frac{lat2 - lat1}{2}\right) + \text{coslat1}\text{coslat2}\sin\left(\frac{lon2 - lon1}{2}\right)2}\right)^2$$

At 330, an artificial intelligence process may determine a derived location relative to a last known position based on a starting (i.e., last known) latitude and longitude, the heading, and the distance traveled. At 344, the system uses the latitude (lat1) and longitude (lon1) of the starting position, the distance traveled (dist), the bearing direction (bearing), and the Earth's radius (R) to compute the current latitude (lat2) and longitude (lon2):

$$lat2 = \sin^{-1}\left(\sin(lat1) * \cos\left(\frac{dist}{R}\right) + \cos(lat1) * \sin\left(\frac{dist}{R}\right) * \cos(bearing)\right)$$

$$lon2 = lon1 + \tan^{-1}\left(\sin(bearing) * \sin\left(\frac{dist}{R}\right) * \cos(lat1), \cos\left(\frac{dist}{R}\right) - \sin(lat1) * \sin(lat2)\right)$$

The system may account for the curvature of the Earth:
```
def radius (B):
    B=math.radians(B) #converting into radians
    a=6378.137 #Radius at sea level at equator
    b=6356.752 #Radius at poles
    c=(a**2*math.cos(B))**2
    d=(b**2*math.sin(B))**2
    e=(a*math.cos(B))**2
    f=(b*math.sin(B))**2
    R=math.sqrt((c+d)/(e+0)
    return R
```

At 348, an MSRS consensus algorithm receives the outputs of 342 and 344 and determines a derived multi-source reckoning system location (DML). If the locations computed by the haversine approach and archaversine approaches align, then the geolocation consensus algorithm may simply adopt the consensus DML. If the two approaches compute different locations, the system may utilize artificial intelligence to compute a weighted average of the two based on confidence values of each approach. The confidence values may be based on the number of sensors used and a consensus ranking of the sensor data used to determine distance, heading, and geolocation. At 350, the system provides a DML, which may be outputted and displayed to a user on a mobile device, such as the mobile device described in the context of FIG. 1. The DML may also be input back into the sensor hub 304 so that the system can evaluate future GPS readings against the DML to evaluate the reliability of received GPS data.

While the system is designed to be useful in operating environments where GPS is unreliable or unavailable, as a byproduct when it is used in environments where GPS is available and reliable it generates and stores in its database DML data along with reliable GPS location data. This data is stored together and analyzed over time in accordance with the process shown in FIG. 3, and this data may be analyzed to track multi-source reckoning system error across many different scenarios and conditions where GPS data may be accurate and multi-source reckoning data may contain error. This multi-source reckoning system virtual machine records the error in association with the actual location data and feeds it into statistical and deep learning models to correct for DML error. The geolocation consensus algorithm may utilize artificial intelligence to correct DML error based on an increasing set of data used to train the system to recognize and correct deviations between known good GPS data and DML data.

The AI process uses a novel deep learning architecture which consists of both convolutional and recurrent neural network layers. The Convolutional Neural Network (CNN) components perform feature extraction and generation techniques to feed into the neural network architecture, while the Recurrent Neural Network (RNN) leverages time-aware, stateful capabilities found in both Gated Recurrent Units (GRU) and Long-Short-Term Memory (LSTM) techniques. Inputs to the hybrid deep learning model are the various sensor data along with their relevant derived features, and the target outputs are specified in two independent techniques: 1) the predicted latitude and longitude, and 2) the predicted error, the latter of which can be accounted for with an intelligent offset.

Figure 4:
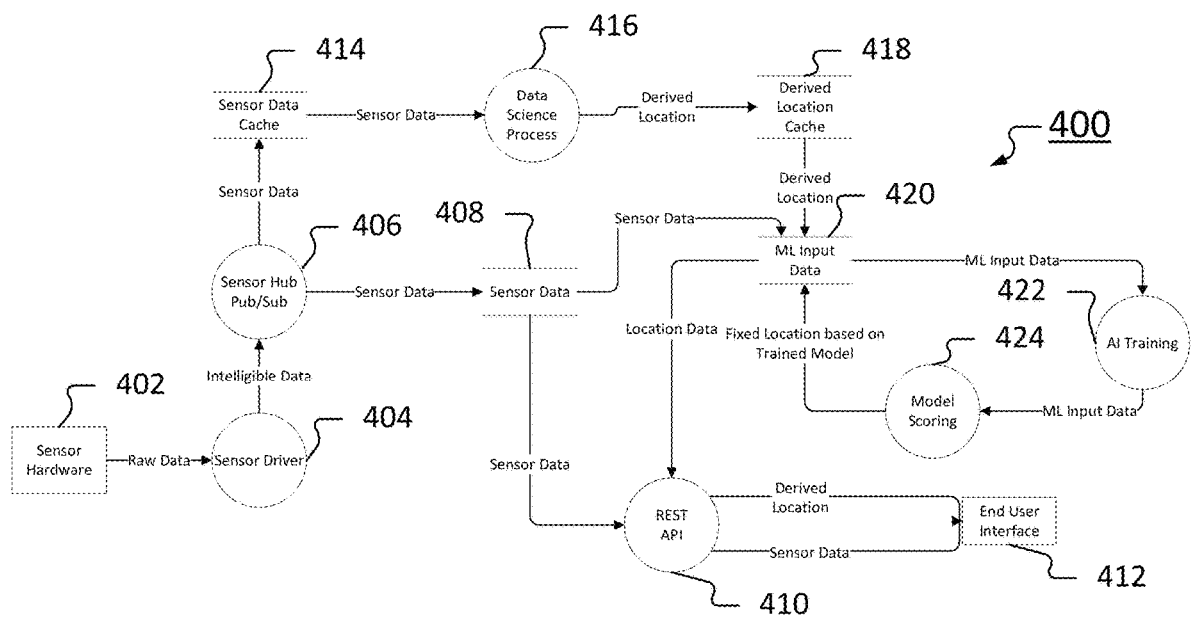
FIG. 4 illustrates a data flow 400 for training artificial intelligence to improve location data derived from sensor data.

FIG. 4 illustrates a data flow 400 for training artificial intelligence to improve location data derived from sensor data. The process starts at 402 where n hardware sensors transmit raw data. As described above, the system is agnostic to the specific sensors used and extensible so that n hardware sensors may be used, each of which may be communicatively coupled to a multi-source reckoning system via a wired or wireless connection. At 404, a sensor driver in a container may receive the raw data and use a driver to interpret and transform the raw sensor data into intelligible data. At 406, a sensor hub may publish useful sensor data to a sensor data store 408, such as a persistent database, to make available to and through a rest API 410. An end user device 412 may then request sensor information, such as GPS location or DMC direction, from rest API 410, which may in turn retrieve that data from sensor data store 408.

At 406, the sensor hub may also publish sensor data to a high-speed cache 414 for further data processing, such as a Redis in-memory data store. At 416, data science processes utilize artificial intelligence to process the sensor data to compute derived location data. For example, the data science processes 416 may include the consensus algorithms and the haversine and archaversine processes described above. At 418, the data science processes may provide derived location data to a high-speed derived location cache, such a Redis cache. At 420, the system stores derived location data in a data store for training a machine learning process and iteratively correcting the derived location data based on the trained artificial intelligence. At 422 the derived location data is provided to a Jetson Tensor flow that processes the location data and outputs raw data to module training 424. The module training 424 fixes or corrects the derived location data based on multi-sensor and historic data input and outputs the fixed location based on a trained model to location data store 420, which may replace the derived location data from cache 418. Location data store 420 may then provide corrected derived location data to rest API 410 for output to a user interface 412.

Figure 5A:
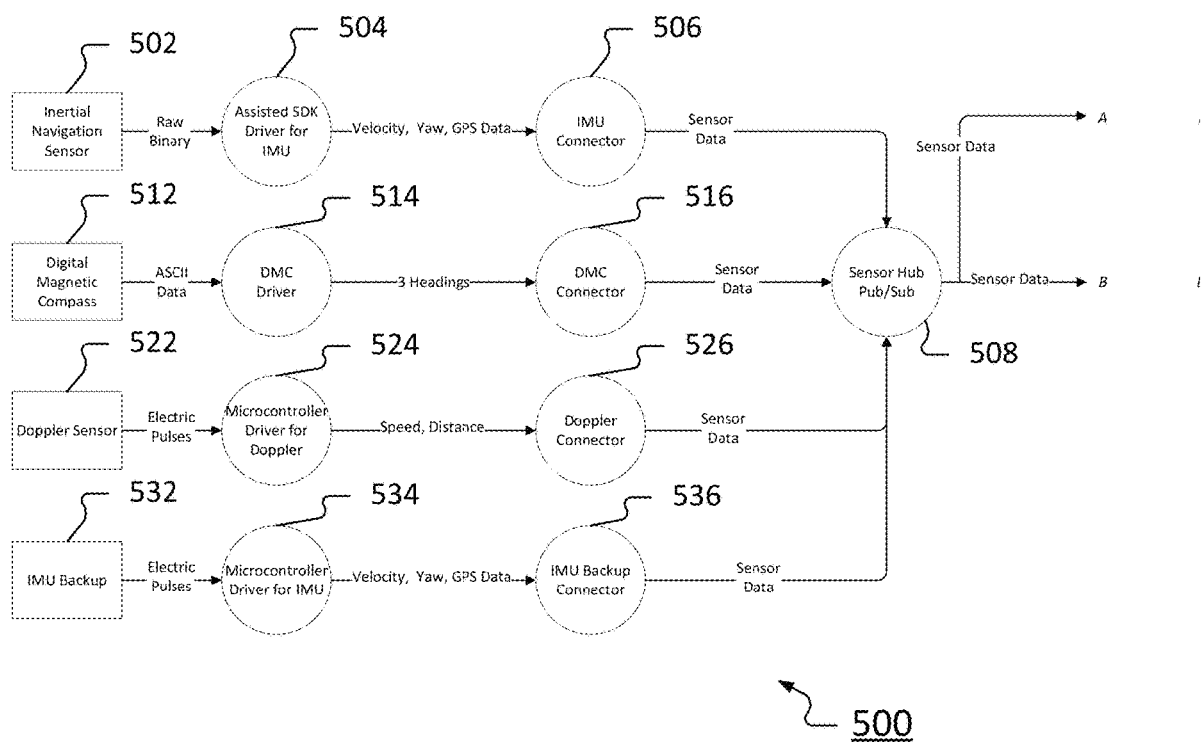
FIGS. 5A and 5B illustrate a data flow 500 for deploying a multi-source reckoning system in a vehicle.
Figure 5B:
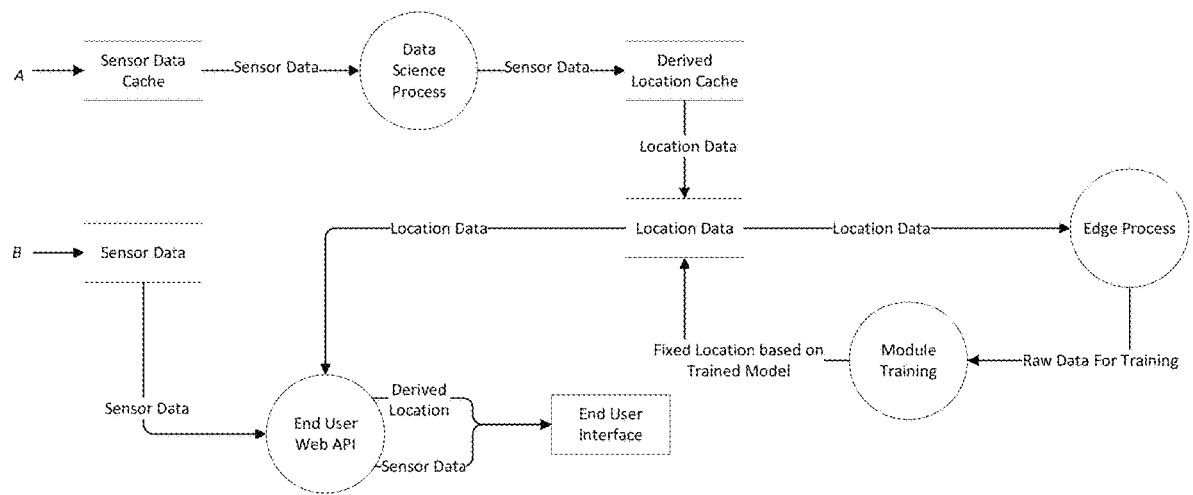

FIGS. 5A-5B illustrate a data flow 500 for deploying a multi-source reckoning system in a vehicle. As shown, the exemplary in-vehicle deployment may utilize an inertial navigation sensor 502, a digital magnetic compass 512, a Doppler sensor 522, and an IMU backup 532. Those sensors or sensor suites may be deployed in the vehicle in a portable manner, such as integrated into a device housing a multi-source reckoning system server, or may be independently vehicle mounted or integrated and communicatively coupled to a multi-source reckoning system server. At 502, the inertial navigation sensor (e.g., an IMU) may send raw binary data to an assisted software development kit driver 504. At 504, the driver may translate and process the raw IMU data to provide velocity, yaw (i.e., bearing or twist about a vertical axis), and GPS data to an IMU connector 506 for consumption by a sensor hub 508. At 512, the DMC may send raw ASCII data to a DMC driver 514. At 514, the DMC driver may translate and process the raw ASCII data into heading/yaw, roll, and pitch information (i.e., 3 angular headings) to a DMC connector 516 for consumption by sensor hub 508. At 522, the Doppler sensor may transmit raw binary to a microcontroller driver for Doppler 524, which may process and transform the Doppler sensor data into speed and distance data and provide the data to a Doppler connector 526 for consumption by sensor hub 508. At 532, the IMU may send raw binary data to a microcontroller driver for the IMU 534, which may process and translate the sensor data into velocity, yaw, and GPS data for an IMU backup connector 536, which may provide the data downstream to the sensor hub 508. The IMU backup may provide additional data to improve module training and cancel error in derived location determinations. Alternatively, the IMU backup may provide a true backup and be utilized by the system only if the primary IMU goes offline or suffers degradation. The process 500 downstream of sensor hub 508 substantially similar to or the same as the process 400 shown in FIG. 4, however the additional sensor data may pay provide more accurate derived location data by canceling errors from individual sensors. Communication the sensor drivers and downstream system elements may be facilitated through a publisher/subscriber service in which a plurality of sensors communicate via a standardized message format over the wired or wireless network. Additional sensors may be added to the messaging service without adjustment to the core framework of the server. The server may also dynamically subscribe and unsubscribe to additional channels allowing for rapid adaptation and sensor configuration.

Figure 6:
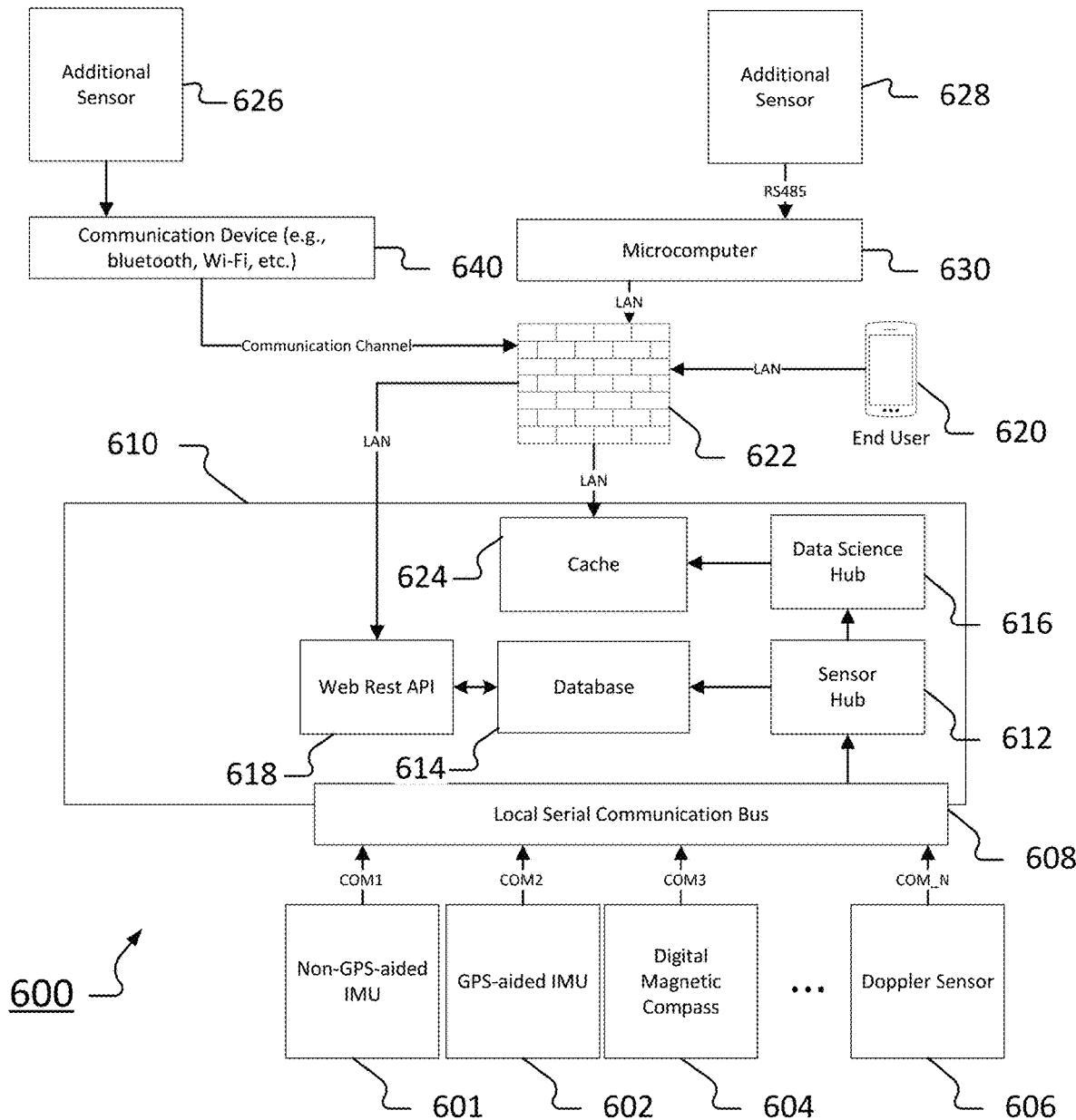
FIG. 6 illustrates a deployment architecture 600 for a multi-source reckoning system.

FIG. 6 illustrates an exemplary deployment architecture for a multi-source reckoning system 600. As shown, the system includes multiple sensors, including non-GPS-aided IMU 601, IMU 602, DMC 604, and Doppler sensor 606, each operatively coupled to a local serial communication bus 608. As shown, the system may include additional sensors operatively coupled to the local serial communication bus 608. Components of the multi-source reckoning system 600 may be deployed in a secure container 610, such as a Pelican container, with wired and/or wireless communication and network interfaces to communicate with sensors and a user interface device. The local serial communication bus 608 provides sensor data to sensor hub 612, which provides processed data to both a database 614 for storing sensor data and a data science hub 616. A web rest API 618 provides an interface for an end user device 620 to request data from the database 614, for example over a wireless local area network ("LAN") connection through a firewall 622. Data science hub 616 provides a cache of MDL data 624 that may also be accessible to an end user device 620 over a LAN (or through web rest API 618).

Multi-source reckoning system 600 may also include one or more additional sensor 628 connected via serial connections to a microcomputer 630, such as a Raspberry Pi device. Microcomputer 630 is configured to interface with the additional sensor 628, receive sensor data, and send the data over a LAN connection to the web rest API 618 for storage in database 614. For example, microcomputer 630 may be utilized to operatively couple sensors installed in a vehicle to the multi-source reckoning system 600.

Multi-source reckoning system 600 may further include one or more additional sensor 626 connected via a communication channel to a communication device 640. Communication device 640 may be configured to interface with the additional one or more sensor 626, receive sensor data, and send data over a communication channel, such as a Bluetooth or Wi-Fi channel, to the web rest API for storage in database 614. Optionally, communication device 640 may also provide a communication channel for another multi-source reckoning system to communicate with multi-source reckoning system 600 to share one or more of sensor data and derived location data.

Figure 7:
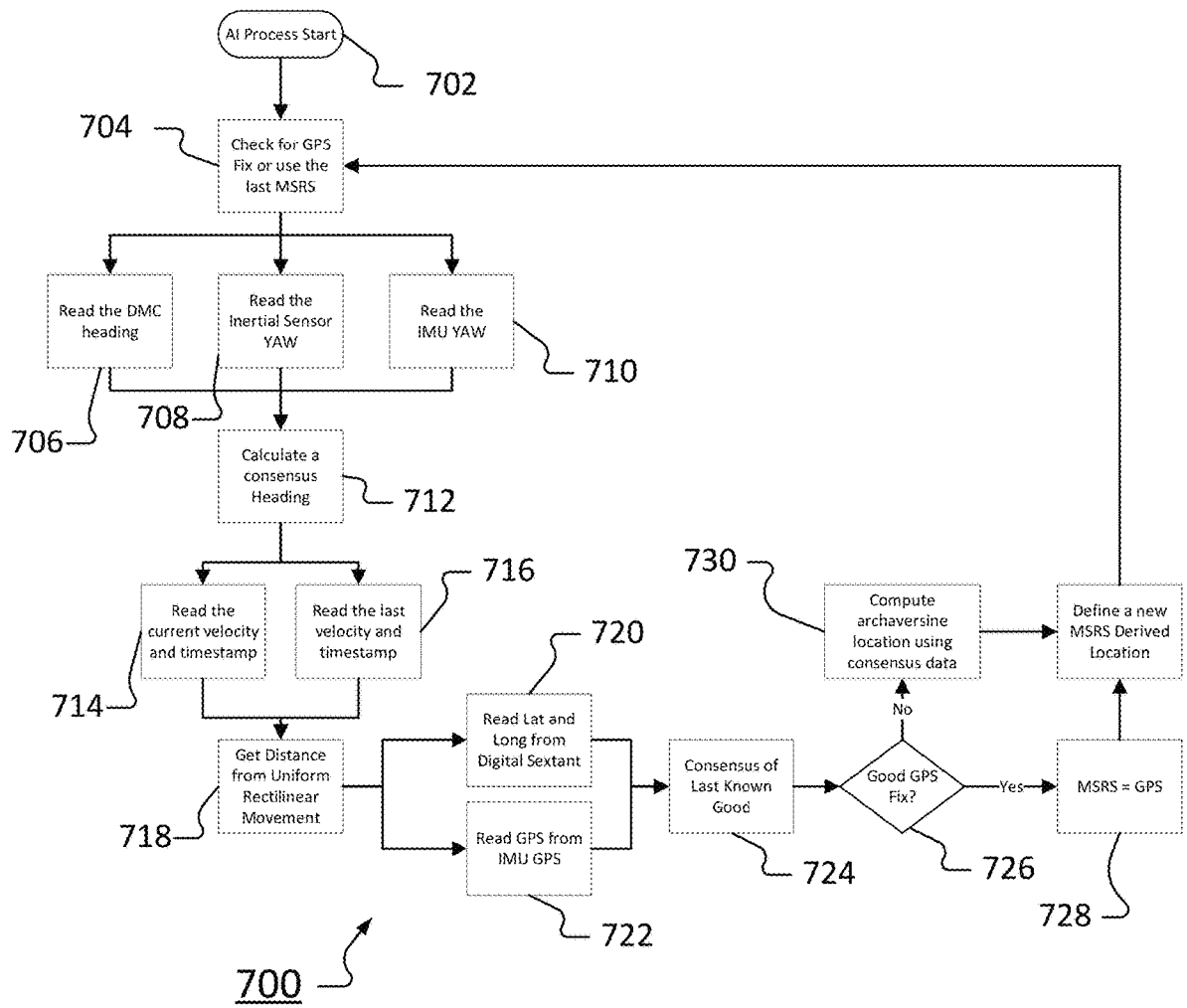
FIG. 7 illustrates an exemplary artificial intelligence process 700 for intelligently defining a multi-source reckoning system derived location.

FIG. 7 illustrates an exemplary artificial intelligence process 700 for intelligently defining a multi-source reckoning system derived location. At 702, the artificial intelligence process starts. At 704, the system checks for a GPS fix or for a last derived multi-source reckoning system location, which the artificial intelligence process uses as the initial position for its reckoning process. At 706, the system reads heading information from a DMC. At 708, the system reads a yaw value from an inertial sensor. At 710, the system reads a yaw value from an IMU. As shown, the sensor readings at 706, 708, and 710 may occur simultaneously to provide the artificial intelligence process with three heading/yaw measurements from three independent sensors. At 712, the artificial intelligence process may then intelligently weight and correct the bearing/yaw data to determine a consensus heading.

At 714, the artificial intelligence process 700 reads the current velocity and timestamp from sensor data. At 716, the process reads the last velocity and timestamp, for example from the last GPS fix, from the last derived multi-source reckoning system location, or from a manual input of a known good location. At 718, the process computes the distance traveled from uniform rectilinear movement using kinematic equations, the starting and ending velocities, and the time between the current velocity and timestamp and the last velocity and timestamp.

At 714, the artificial process reads latitude and longitude data received from a computer vision process. At 722, the process reads GPS data from a GPS included in the IMU sensor suite. At 724, the process weights and corrects the location data from the computer vision process and IMU GPS to determine a last known good location.

At step 726, the process determines whether it has a high degree of confidence that it has a good GPS fix. If the process determines that it has a reliable GPS fix, at 728 it assigns the GPS location as the multi-source reckoning system location. If the process determines that the GPS is unreliable, for example because it is denied, degraded, or spoofed, at 730 the process computes the archaversine location using the consensus last known good location, the consensus bearing, and the consensus distance (i.e., great circle distance). At 732, the process defines the new multi-source reckoning system location as either the GPS location if GPS has a good fix, or as the archaversine location based on consensus values determined by multi-source sensor data if the GPS lacks a good fix.

Figure 8:
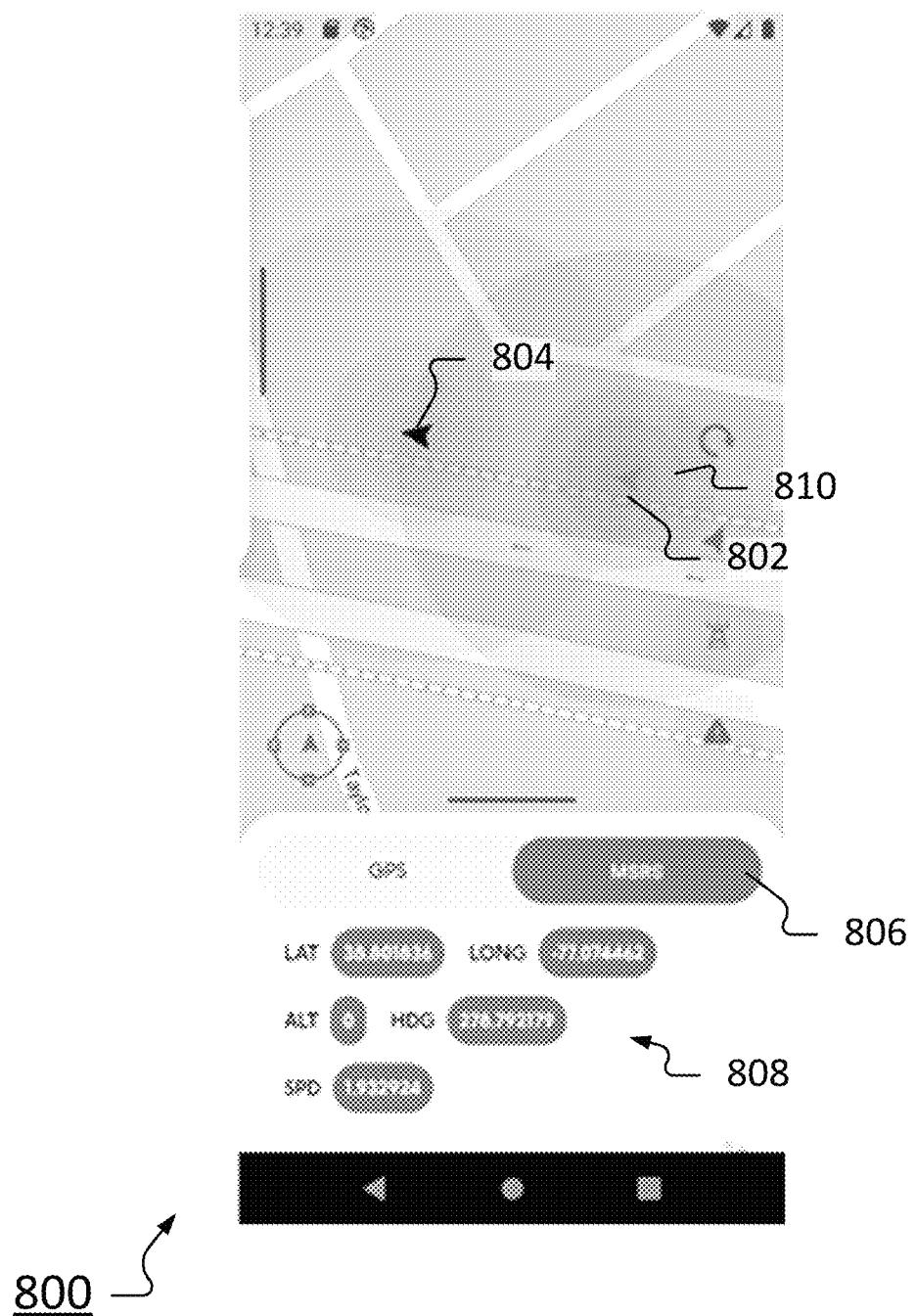
FIG. 8 shows an exemplary user interface for interacting with a multi-source reckoning system implementing an exemplary embodiment illustrating GPS and MSRS fixes.

FIG. 8 shows an exemplary user interface 800 for interacting with a multi-source reckoning system implementing an exemplary embodiment illustrating GPS and MSRS fixes. The user interface may be provided, for example, on mobile device 160 described above, such as an Android phone or tablet. User interface 800 displays an icon 804 showing a GPS fix as well as an icon 802 showing an MSRS fix, thus enabling a user to observe if the GPS icon 804 moves erratically or otherwise deviates from the MSRS fix icon 802. In such situations, a user may choose to rely on the MSRS fix icon 802 to understand their location. The GPS icon 804 and the MSRS icon 802 may be distinguished in conventional ways, such as by displaying different graphics or by displaying icons with different colors. User interface 800 may also include one or more zones 810 surrounding either or both icons showing the degree of certainty of the positioning. User interface 800 may also include a user-selectable control 806 to allow the user to select whether to see additional location information 808 associated with either the GPS fix or the MSRS fix. The additional location information 808 may include latitude, longitude, altitude, heading, and speed.

Figure 9:
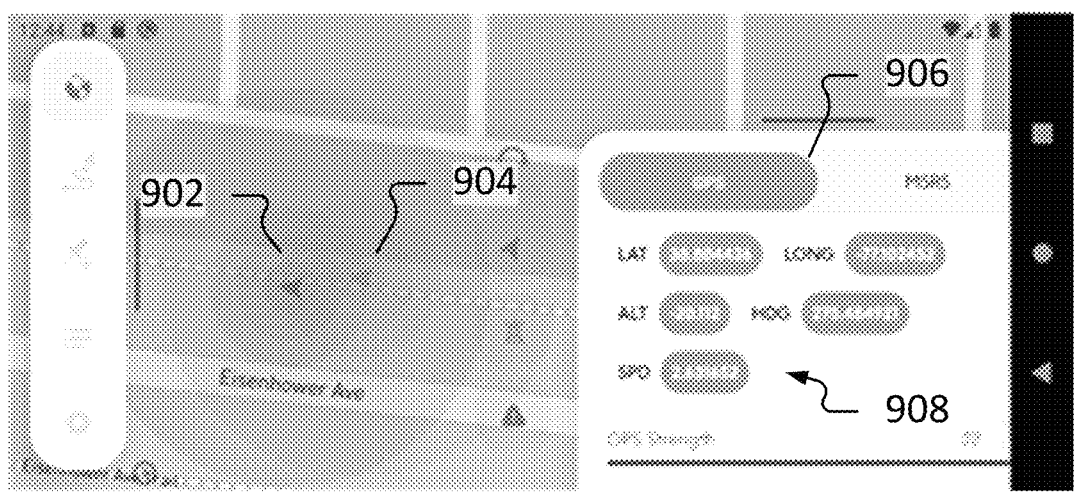
FIG. 9 shows an exemplary user interface 900 for interacting with a multi-source reckoning system implementing an exemplary embodiment illustrating GPS location information.

FIG. 9 shows an exemplary user interface 900 for interacting with a multi-source reckoning system implementing an exemplary embodiment illustrating GPS location information. User interface 900 is substantially similar to user interface 800, however it is displayed in a landscape view. User interface 900 displays an MSRS fix icon 902, a GPS fix icon 904, and a user-selectable control 906 to allow the user to select whether to see additional location information 908 associated with either the GPS fix or the MSRS fix. While FIG. 8 shows the user-selectable control 806 toggled to display additional location information associated with the MSRS fix, FIG. 9 shows the user-selectable control 906 toggled to display additional location information associated with the GPS fix.

Figure 10:
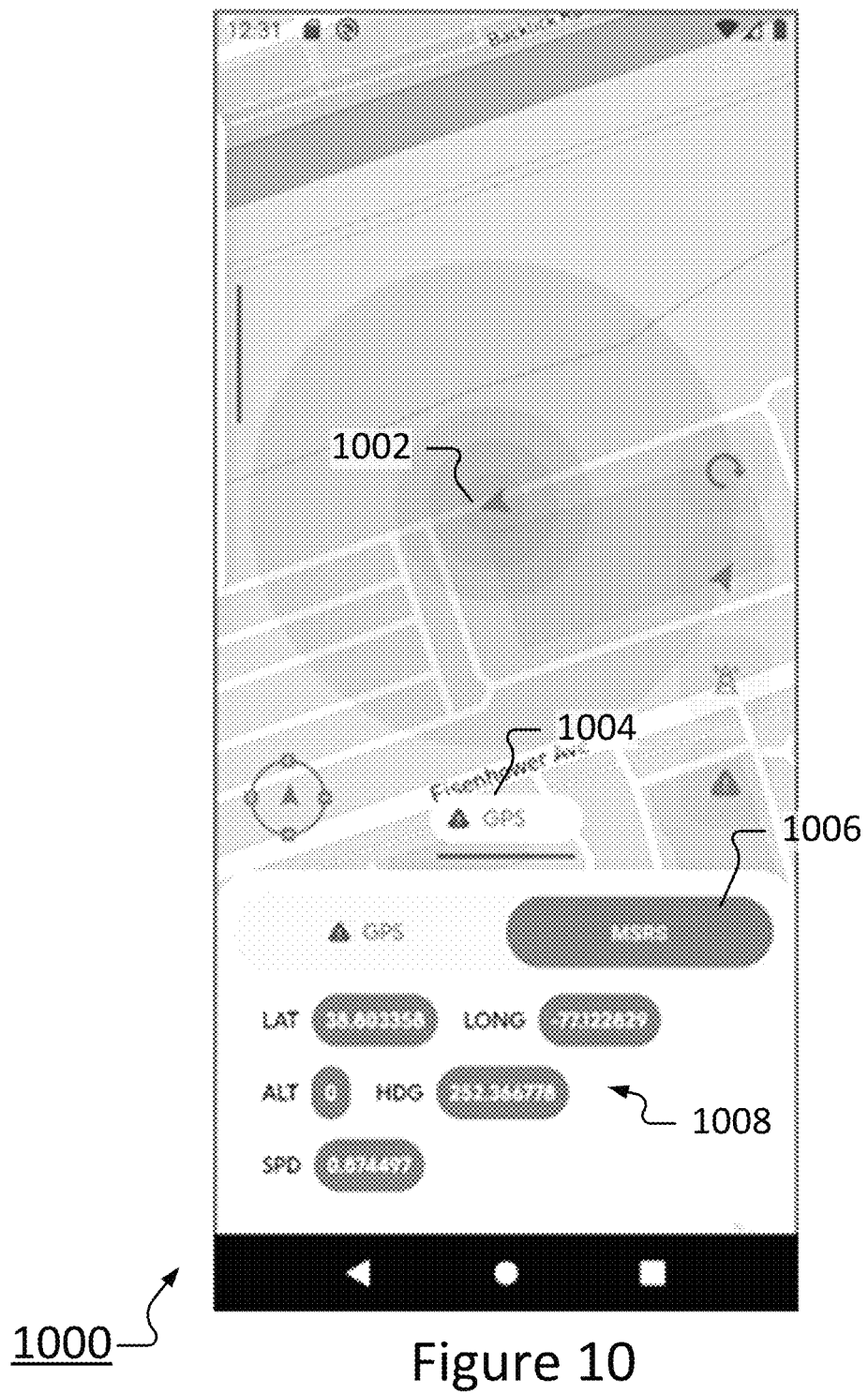
FIG. 10 shows an exemplary user interface 1000 illustrating an MSRS derived location only when a GPS fix is lost.

FIG. 10 shows an exemplary user interface 1000 illustrating an MSRS derived location only when a GPS fix is lost. User interface 1000 includes a GPS status icon 1004 showing that a GPS fix is lost. Embodiments may also show the same or a similar GPS status icon 1004 when a GPS fix is available, but the MSRS system determines that it is unreliable, such as if it is spoofed. When GPS is unavailable or unreliable, the user interface 1000 may display the MSRS fix icon 1002 without displaying a GPS icon. User-selectable control 1006 may be configured to disable toggling to display additional location information 1008 associated with a GPS fix when GPS is unavailable or unreliable.

Figure 11:
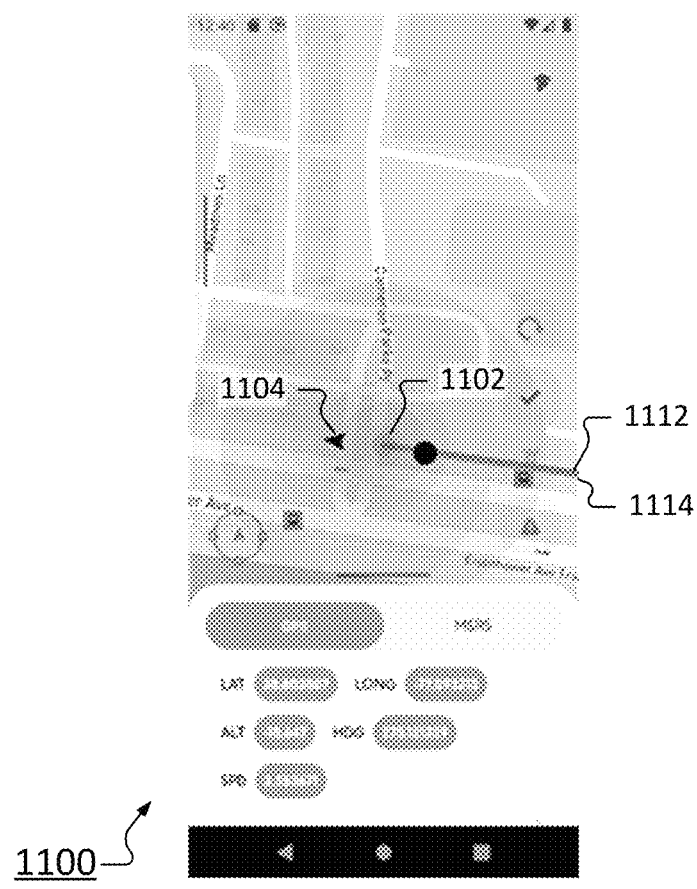
FIG. 11 shows an exemplary user interface 1100 including GPS and MSRS tracklines.

FIG. 11 shows an exemplary user interface 1100 including GPS and MSRS tracklines. User interface 1100 shows a GPS fix icon 1004 and an MSRS fix icon 1002 like those shown in prior figures. User interface 1100 also shows an MSRS trackline 112 and a GPS trackline 114 showing the prior locations of the GPS and MSRS locations on a map. The GPS and MSRS tracklines enable a user to track cohesion over time.

The embodiments disclosed herein incorporate features of this invention. They provide exemplary configurations of the present invention, which is more precisely defined by the claims attached hereto. It should be understood that the described embodiments may be modified in arrangement and detail without departing from principles of this invention. For example, the extensible design disclosed herein enables the invention to utilize alternative sensors, and the artificial intelligence processes disclosed herein are adaptable to derive location, distance, and bearing information from various sensors.

We claim:

1. A method, executed by a computing device, for dynamically computing a derived multi-source reckoning system location, the method comprising:
   receiving, by the computing device, data from an inertial measurement unit, including GPS data, velocity data, and bearing data;
   receiving, by the computing device, data from a digital magnetic compass, including bearing data;
   receiving, by the computing device, data from a Doppler sensor, including velocity data and distance data;
   determining, by the computing device, whether GPS location data is in consensus with a previous derived multi-source reckoning system location;
   determining, by the computing device, a consensus distance value from a weighted average of data from the inertial measurement unit and the Doppler sensor;
   determining, by the computing device, a consensus heading value from a weighted average of data from the inertial measurement unit and the digital magnetic compass;
   determining, by the computing device, a consensus geolocation value from a weighted average of data from the inertial measurement unit and the previous derived multi-source reckoning system location;
   deriving, by the computing device, a distance between the previous derived multi-source reckoning system location and the consensus geolocation value using a haversine approach;
   deriving, by the computing device, a new location using an archaversine approach using the previous derived multi-source reckoning system location, the consensus distance value, and the consensus heading value;
   determining, by the computing device, a derived multi-source reckoning system location from the distance between the previous derived multi-source reckoning system location and the new location; and
   displaying, by the computing device, on a user interface a GPS fix icon and a different multi-source reckoning system fix (MSRS fix) icon, the GPS fix icon indicating the GPS location and the MSRS fix icon indicating the derived new location, the GPS fix icon and the MSRS fix icon are spaced apart from each on the user interface to show a degree of certainty of positioning to a user, wherein, only the MSRS fix icon is displayed on the user interface and not the GPS fix icon when the multi-source reckoning system location determines that the GPS is unavailable or unreliable.

2. The method of claim 1, further comprising:
   storing GPS data in a database over a period of time;
   computing a difference vector by comparing GPS data received from the inertial measurement unit and GPS data stored in the database over a period of time; and
   prompting the user for manual input after determining that the difference vector surpasses a threshold value.

3. The method of claim 1, wherein the determining, by the computing device, the derived multi-source reckoning system location includes employing artificial intelligence consisting of both a convolutional neural network layer and a recurrent neural network layer.

4. The method of claim 1, further comprising:
   inputting the GPS data, the velocity data, and the bearing data from the inertial measurement unit into a hybrid deep learning model;
   inputting the bearing data from the digital magnetic compass into the hybrid deep learning model;
   inputting the velocity data and the distance data from the Doppler sensor into the hybrid deep learning model;
   computing a predicted latitude and a predicted longitude with the hybrid deep learning model;
   computing a predicted error with the hybrid deep learning model; and
   correcting the derived multi-source reckoning system location using the computed predicted error.

5. The method of claim 1, further comprising: monitoring for sequential GPS satellite drops, and increasing reliance on non-GPS sensor data upon detection of sequential satellite drops.

6. The method of claim 1, further comprising: monitoring for dropped GPS satellites, and increasing reliance on non-GPS sensor data when the GPS data is computed from data received from less than six satellites.

7. A method, executed by a computing device, for dynamically computing a derived multi-source reckoning system location, the method comprising:
   receiving, by the computing device, data from an inertial measurement unit;
   receiving, by the computing device, data from a digital magnetic compass, including bearing data;
   receiving, by the computing device, data from a Doppler sensor;
   determining, by the computing device, whether GPS location data is in consensus with a previous derived multi-source reckoning system location;
   determining, by the computing device, a consensus distance value from a weighted average of data from the inertial measurement unit and the Doppler sensor;
   determining, by the computing device, a consensus heading value from a weighted average of data from the inertial measurement unit and the digital magnetic compass;
   deriving, by the computing device, a new location using the previous derived multi-source reckoning system location, the consensus distance value, and the consensus heading value; and
   displaying, by the computing device, on a user interface a GPS fix icon and a different multi-source reckoning system fix (MSRS fix) icon, the GPS fix icon indicating the GPS location and the MSRS fix icon indicating the derived new location, the GPS fix icon and the MSRS fix icon are spaced apart from each on the user interface to show a degree of certainty of positioning to a user, wherein, only the MSRS fix icon is displayed on the user interface and not the GPS fix icon when the multi-source reckoning system location determines that the GPS is unavailable or unreliable.

8. The method of claim 7, further comprising:
storing GPS data in a database over a period of time;
computing a difference vector by comparing GPS data received from the inertial measurement unit and GPS data stored in the database over a period of time; and
prompting the user for manual input after determining that the difference vector surpasses a threshold value.

9. The method of claim 7, further comprising:
inputting the GPS location data, velocity data, and bearing data received from the inertial measurement unit into a hybrid deep learning model;
inputting the bearing data from the digital magnetic compass into the hybrid deep learning model;
inputting the velocity data and the distance data from the Doppler sensor into the hybrid deep learning model;
computing a predicted latitude and a predicted longitude with the hybrid deep learning model;
computing a predicted error with the hybrid deep learning model; and
correcting the derived multi-source reckoning system location using the computed predicted error.

10. The method of claim 7, further comprising: monitoring for sequential GPS satellite drops, and increasing reliance on non-GPS sensor data upon detection of sequential satellite drops.

11. The method of claim 7, further comprising: monitoring for dropped GPS satellites, and increasing reliance on non-GPS sensor data when the GPS data is computed from data received from less than six satellites.

12. A multi-source reckoning system comprising:
a compute platform,
an inertial measurement unit communicatively coupled to the compute platform, wherein the inertial measurement unit is configured to send GPS data, velocity data, and bearing data to the compute platform;
a digital magnetic compass communicatively coupled to the compute platform, wherein the digital magnetic compass is configured to send bearing data to the compute platform;
a Doppler sensor communicatively coupled to the compute platform, wherein the Doppler sensor is configured to send at least one of velocity data and distance data to the compute platform,
wherein the compute platform is configured to:
determine whether GPS location data is in consensus with a previous derived multi-source reckoning system location;
determine a consensus distance value from a weighted average of data from the inertial measurement unit and the Doppler sensor;
determine a consensus heading value from a weighted average of data from the inertial measurement unit and the digital magnetic compass;
derive a new location using the previous derived multi-source reckoning system location, the consensus distance value, and the consensus heading value; and
display, by the compute platform, to a user interface of a mobile device, a display showing a GPS fix icon indicating the GPS location and a multisource reckoning system fix icon indicating the derived new location, the GPS fix icon and the MSRS fix icon are spaced apart from each on the user interface to show a degree of certainty of positioning to a user,
wherein, only the MSRS fix icon is displayed on the user interface and not the GPS fix icon when the multi-source reckoning system location determines that the GPS is unavailable or unreliable.

13. The multi-source reckoning system of claim 12, further comprising outputting to the user interface of the mobile device additional location information including heading and speed, wherein the user interface includes a user-selectable control to allow the user to select whether the additional location information is associated with either the GPS fix icon or the MSRS fix icon.

14. The multi-source reckoning system of claim 12, further comprising outputting to the user interface of the mobile device additional location information including latitude and longitude, wherein the user interface includes a user-selectable control to allow the user to select whether the additional location information is associated with either the GPS fix or MSRS fix icon.

15. The multi-source reckoning system of claim 12, further comprising outputting to the user interface of the mobile device one or more zones surrounding the new derived location icon showing a degree of certainty of the MSRS fix icon.

16. The multi-source reckoning system of claim 12, further comprising outputting to the user interface of the mobile device one or more tracklines.

17. The multi-source reckoning system of claim 12, wherein the compute platform is further configured to:
store GPS data in a database over a period of time;
compute a difference vector by comparing GPS data received from the inertial measurement unit and GPS data stored in the database over a period of time; and
output, to the user interface of the mobile device, a prompt for manual input after determining that the difference vector surpasses a threshold value.

18. The multi-source reckoning system of claim 12, wherein the compute platform is further configured to:
input the GPS data, the velocity data, and the bearing data from the inertial measurement unit into a hybrid deep learning model;
input the bearing data from the digital magnetic compass into the hybrid deep learning model;
input the velocity data and the distance data from the Doppler sensor into the hybrid deep learning model;
compute a predicted latitude and a predicted longitude with the hybrid deep learning model; compute a predicted error with the hybrid deep learning model; and
correct the new location using the computed predicted error.

19. The multi-source reckoning system of claim 12, wherein the compute platform is further configured to monitor for sequential GPS satellite drops, and increases reliance on non-GPS sensor data upon detection of sequential satellite drops.

20. The multi-source reckoning system of claim 12, wherein the compute platform is further configured to monitor for dropped GPS satellites, and increases its reliance on non-GPS sensor data when the GPS data is computed from data received from less than six satellites.

21. The method of claim 1, wherein,
each one of the GPS fix icon and the MSRS fix icon display different graphics or colors, and
the user interface further includes a user-selectable control for the user to toggle additional location information between either the GPS fix or the MSRS fix, the user-selectable control is disabled if the GPS is unavailable or unreliable.

* * * * *